June 25, 1963
R. C. DREIER
3,094,816
MACHINE TOOL
Filed March 26, 1959
2 Sheets-Sheet 1
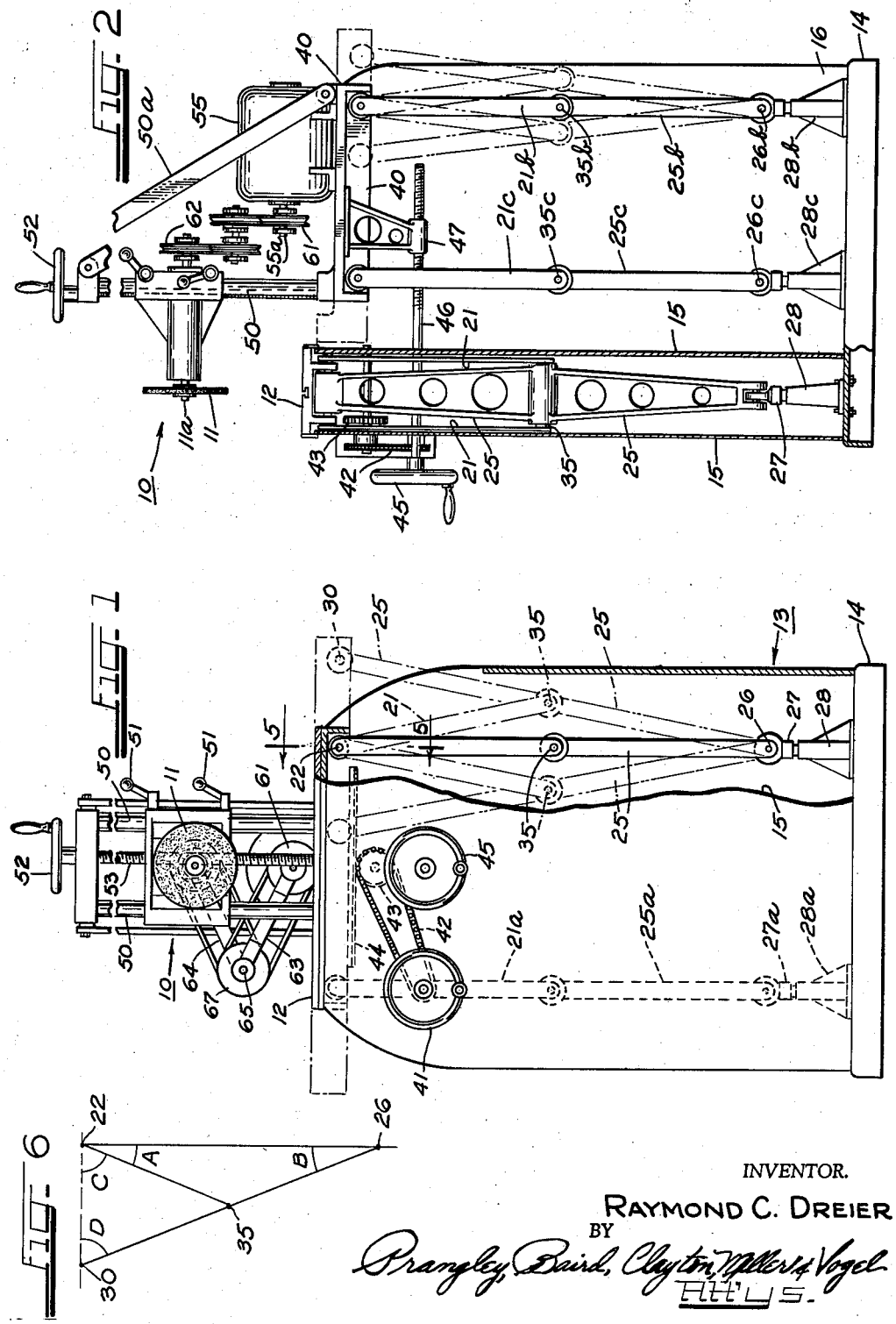
INVENTOR.
RAYMOND C. DREIER
BY

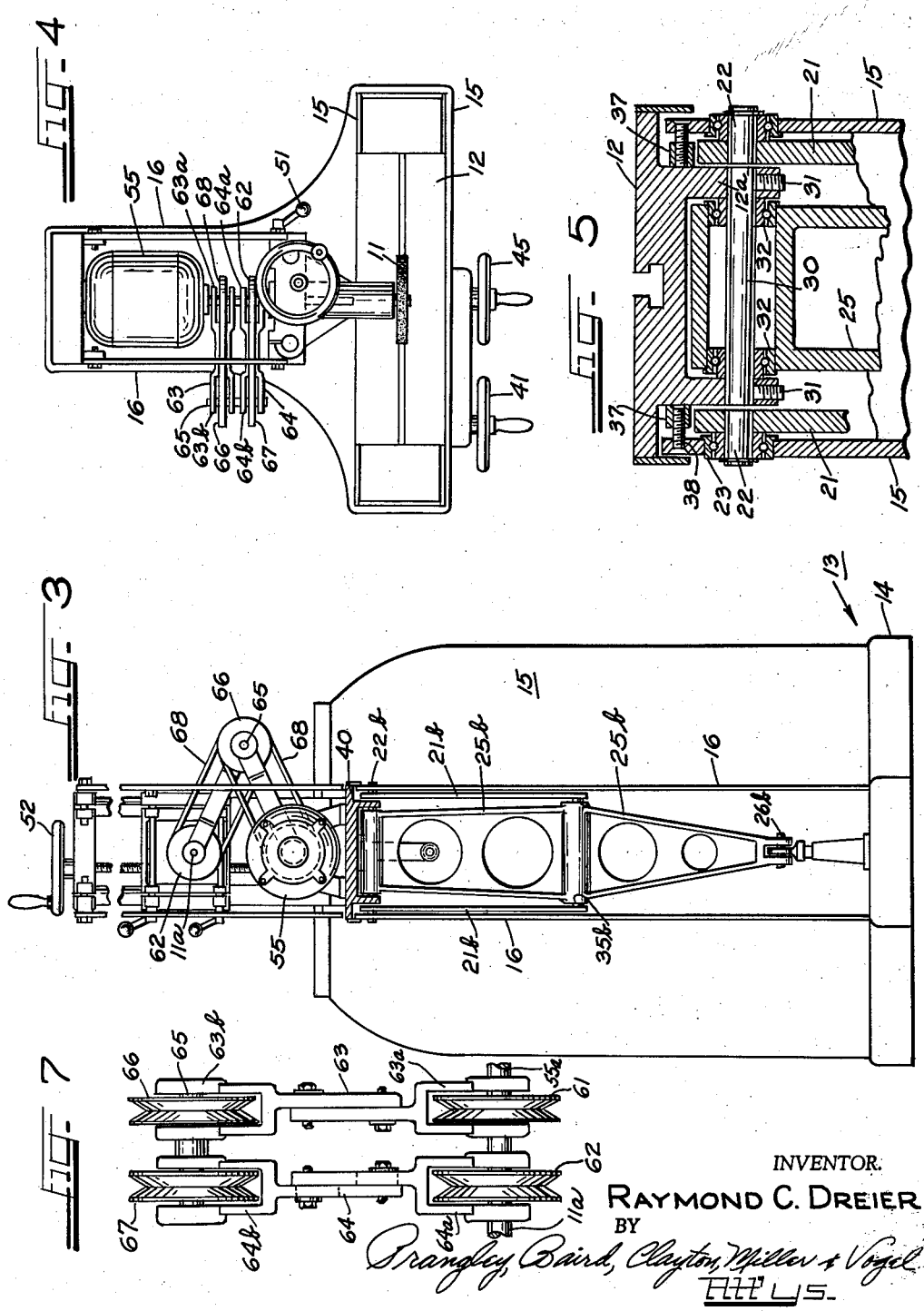

United States Patent Office 3,094,816
Patented June 25, 1963

3,094,816
MACHINE TOOL
Raymond C. Dreier, 7326 Kingston Ave., Chicago, Ill.
Filed Mar. 26, 1959, Ser. No. 802,057
4 Claims. (Cl. 51—92)

The present invention relates to apparatus for limiting two members to linear movement relative to each other and to a machine tool incorporating such apparatus.

One conventional means or apparatus heretofore employed in machine tools and the like for mounting one member for linear movement with respect to another member includes one or more ways along which one member may slide with respect to the other. Such apparatus confines the members to linear relative movement. By this definition the members are prevented from moving relative to each other in any but two opposite directions and are prevented from pivotal movement about any axis with respect to each other. Such prior art apparatus has the disadvantage of being costly, since precision ways are expensive to manufacture. This is particularly true since such ways are very commonly required to be at least twice as long as the desired stroke or relative movement of the two members in order that the member which slides on the ways may have widely spaced points of engagement with the ways for proper stability. The use of such ways in surface grinders, shapers and other machine tools has been common for many years, but they have added very materially to the cost and expense of such tools because the ways ordinarily must be finished by hand where precision is required and the ways are subject to substantial wear in use, particularly when abrasives are used in or about the machine.

One of the important objects of the present invention is to provide an improved linkage for limiting two members to linear movement relative to each other.

It is still another object of the invention to provide an improved linkage for limiting two members to separately controllable linear movement in two specified directions relative to each other.

Another object of the invention is to provide improved apparatus for controlling relative movement of the work table and work head of a machine tool.

It is a further object of the invention to provide a machine tool having a work head and a work table and having improved linkage for limiting the work head and the work table to linear relative movement.

It is a still further object of the invention to provide a machine tool having a work head and a work table and improved linkage for limiting relative movement of the work head and work table to separately controllable linear movement in two specified directions.

It is another object of the invention to provide an improved linkage having various of the characteristics specified above, which accurately controls relative movement of two members to linear movement while providing a minimum of friction and permitting economical construction thereof.

In accordance with one feature of the present invention two members are connected to each other through a pair of relatively inexpensive linkage assemblies which limit the two members to linear movement relative to each other, the linkage assemblies taking the place and serving the purpose of relatively expensive, precision machined ways. In a machine tool incorporating such a linkage assemblies a work table may be limited to linear movement relative to a work head whereby accurate grinding, planing or other tooling may be performed by the work head upon a work piece supported by the work table. A second pair of linkage assemblies may be provided for permitting relative movement of the work head and work table along another line. It will be understood that relative movement along the two lines may be controlled separately or jointly to the effect that repeated reciprocal relative movements along one of the permitted lines of movement may be accompanied by, or may alternate with, gradual relative movement along the other permitted line of movement, whereby a machining operation may be applied to a large area of the work piece.

These and other features, objects and advantages of the present invention will be better understood from the following description of a preferred embodiment thereof, taken in conjunction with the accompanying drawings. In the drawings, wherein like parts are designated by like reference numerals:

FIG. 1 is a front elevational view, partially broken away, of a machine tool incorporating linkages comprising one feature of the present invention and showing by phantom lines one linkage assembly in various operating positions;

FIG. 2 is a side elevational view of the same machine, partially broken away, illustrating in various operating positions additional linkage assemblies embodied in the machine;

FIG. 3 is a rear elevational view of the same machine;

FIG. 4 is a top plan view of the machine;

FIG. 5 is an enlarged fragmentary cross-sectional view taken substantially along the line 5—5 of FIG. 1;

FIG. 6 is a diagram for facilitating geometric proof of the operation of the linkage assemblies incorporated in the machine tool of FIGS. 1 to 5; and FIG. 7 is an enlarged fragmentary plan view of the drive connection employed between the drive motor of the machine and the work head thereof.

As indicated above, the linkage assembly constituting one important feature of the present invention is particularly adapted for use with, or as a part of, a machine tool, and the assembly is disclosed in the drawings in such an application. It is to be understood, however, that the linkage assembly has broad applicability and is not limited necessarily to application to a machine tool.

The machine tool disclosed in the drawings has a work head 10 including, in the illustrated embodiment of the invention, a grinding wheel 11. Cooperating therewith is a work table 12 for supporting a work piece to be subjected to a grinding operation. The work head 10 and work table 12 are supported on a common base or frame 13, including a footing 14 and a pair of spaced-apart upstanding walls 15 extending across the front of the machine and another pair of spaced walls 16 extending from the rearwardmost wall 15 to the rear of the machine. The respective ends of the pairs of walls 15 and 16 are preferably interconnected in any suitable manner, to as great a height as possible, for maximum rigidity.

The work table 12 is supported on the base 13 by a pair of linkage assemblies which permit movement of the work table in a single plane to the left and to the right (as viewed in FIG. 1) but which restrain the work table from movement in any other direction and from pivotal movement about any axis. Since the two linkage assemblies of the pair are identical in the illustrated embodiment, only the right hand one (as viewed in FIG. 1) will be described in detail, the other having its parts identified in the drawings by like reference numerals followed by the letter "a."

As will be recognized by those skilled in the art, each of the two linkages which support and control the work table 12 on the base 13 is of a general form known as a Scott Russell linkage. The disclosed linkage, however, incorporates an improved form of Scott Russell linkage, and employs such linkages in pairs to produce results not obtainable with a single linkage of the Scott Russell type.

A pair of depending bars 21 form collectively in the illustrated embodiment a first link, hereinafter sometimes referred to as the link 21. As seen in FIGS. 1 and 2 and as shown in detail in FIG. 5, these bars are pivotally connected at their upper ends to the respective walls 15 along a common axis, by a pair of aligned stub shafts or pins 22. The respective pins 22 are firmly anchored in the bars 21 and ride in suitable ball bearing assemblies 23, the latter being set in the walls 15 so that the two bars 21 pivotally depend from the upper portions of the respective walls 15 adjacent the table 12.

A second link 25 is pivotally and slidably connected at its lower end to the base 13, as best seen in FIGS. 1 and 2. More specifically, pivotal movement of the link 25 is permitted about a pin 26 through which the link 25 is connected to a plunger member 27, and vertical sliding movement is permitted by virtue of the member 27 being received within a sleeve or cylinder 28.

The upper end of the link 25 is pivotally connected to and supports one end of the work table 12 by means of a pin 30. This pin is set in downwardly projecting, apron-like portions 12a of the work table 12, and is secured therein by set-screws 31 (see FIG. 5). Suitable ball bearing assemblies 32 are mounted in the link 25 rotatably to receive the pin 30 and permit pivotal movement of the link 25 with respect to the work table 12.

The lower end of the link 21 is pivotally connected to the link 25 by a pin 35, which is firmly set in the lower ends of the two bars of the link 21 and is received by suitable bearing means carried by the link 25, as suggested by FIG. 2. The axis of the pin 35 lies on a straight line with the axes of the pins 26 and 30 and is equally spaced therefrom.

As best seen in FIG. 2, the link 25 may be in the form of a girder and has sufficient width at its pivotal connection with the work table to provide stability to the table. More specifically, the pin 30 engages both the link 25 and the work table at sufficiently widely spaced points to provide adequate stability. It will be seen that the same holds true for the pivotal connection between the link 25 and the link 21, the pin 35 engaging the bars 21 comprising the link 21 at widely spaced points. The link 21 also is suspended from the rigid walls 15 of the base 13 at relatively widely spaced points. Accordingly, the work table is firmly held against lateral movement or twisting. Further, to assure proper alignment of the work table, guides 37 may be employed as shown in FIG. 5. These guides may be adjustably secured to the walls 15 as by screws 38 and slidably bear against the outer surfaces of the apron-like portions of the work table 12.

The entire work head 10 is mounted upon a platform 40 which is, in turn, supported by a pair of linkages or linkage assemblies which may be identical to the paired linkages supporting the work table 12. In the drawings the pair of linkages and the parts thereof supporting the platform 40 are identified by the same reference numerals which identify the previously described linkages, with the exception that the numerals for the parts are followed by the letter "b" or "c." In the illustrated embodiment of the invention the linkages supporting the platform 40 are slightly shorter and wider than the linkages supporting the work table 12 but they are otherwise identical, and accordingly are not described in detail herein.

It will be seen from the drawings that this second pair of linkages permits linear movement of the platform 40 in a single plane in a direction perpendicular to the direction of movement of the work table 12. Accordingly, the work head 10 may be made to move laterally of the direction of movement of the work table 12. Thus, a work piece carried by the work table may be made to move back and forth to the left and to the right as viewed in FIG. 1 to accomplish grinding of the work piece along a straight path, of width equal to the thickness of the grinding wheel 11. After completion of one or more reciprocations, as permitted by the first described pair of linkages, the platform 40 and the work head 10 thereon may be moved, as allowed by the second pair of linkages, to position the grind wheel 11 laterally of its original position for the next stroke or reciprocation of the work table 12.

Means are disclosed in the drawings for manual operation of the work table 12 and the platform 40. In FIG. 1 a hand wheel 41 is shown rotatably supported on one wall 15. A link chain 42 connects a suitable sprocket on the hand wheel 41 to a second sprocket which drives a gear 43, seen best in FIG. 2. This gear engages a rack 44 mounted on the work table 12. Accordingly, it may be seen that rotation of the hand wheel 41 will drive the work table 12 to the left or the right as viewed in FIG. 1. Another hand wheel 45 is connected to a shaft 46 best seen in FIG. 2 whose rearward portion threadedly engages a bracket 47 secured to the platform 40. The shaft 46 is rotatably mounted on the walls 15 and is suitably restrained against axial movement with respect thereto. It will be apparent that rotation of the hand wheel 45 will therefore cause movement of the platform 40 and the work head 10 to the right or to the left as viewed in FIG. 2 and as permitted by the second pair of linkages. It will be understood, of course, that movement of the work table 12 and of the platform 40 may be power driven, with or without automatic controls, all as is common in the art.

It is also desirable that the work head 10 be arranged for vertical movement with respect to the platform 40 in order that work pieces of different heights or thicknesses may be mounted on the work table and subjected to a grinding operation. In the illustrated embodiment of the invention such vertical movement of the work head 10 is permitted by virtue of its being mounted on vertical ways 50 which are set in any suitable manner in the platform 40 and secured by braces 50a. The work head may be locked in position on the vertical ways 50 by suitable clamps controlled by hand levers 51. Since the use of such ways, cooperating slides and locking clamps is common in the art, this particular part of the apparatus need not be described in detail herein. A hand wheel 52 and an associated threaded shaft 53 are provided for adjusting the height of the work head 10 when the locking clamps have been released by the hand levers 51, this also being common in the art.

It will be seen that only the work head 10 is vertically movable on the ways 50, a motor 55 which drives the grind wheel 11 being mounted directly upon the platform 40 and accordingly not moving vertically with the work head. Accordingly, only a relatively light load, namely the work head 10, is supported on the vertical ways 50 which may therefore be of relatively light construction. Novel means are provided, however, for completing a power connection from the motor 55 to the work head 10 and, more specifically, to the grind wheel 11.

Referring particularly to FIGS. 1 to 4 and 7, it will be seen that a flexible elbow-like assembly utilizing pulleys and belts is provided for transmitting driving force from the electric motor 55 to the shaft 11a of the grinding wheel 11. The elbow assembly comprises a pair of substantially identical links 63 and 64, each of which may be fabricated in two parts so that its length may be adjusted in a manner to be described hereinafter. As best seen in FIG. 7, the link 63 is provided with a bifurcated end portion 63a which is rotatably mounted on the shaft 55a of the motor 55, the shaft 55a thereby supporting the bifurcated end 63a of the link 63 but yet being free to turn or rotate therein. Suitable bearings, such as sealed ball bearing assemblies, may be provided in the bifurcated end 63a for engagement with the shaft 55a. The opposite end 63b of the link 63 is similarly bifurcated and carries therein an idler shaft 65, the bifurcated end 63b like the end 63a being provided with bearings which permit the shaft 65 to rotate freely. The shaft 65 extends from one side of the bifurcated end 63b of the link 63, and this extension on the shaft has mounted thereon a bifurcated end 64b of the link 64. The bifurcation 64b is preferably similarly provided with suitable bearings for receipt of the shaft 65, it being thus understood that the shaft 65 is free to rotate in the bifurcated ends 63b and 64b and that the links 63 and 64 are likewise free to pivot with respect to each other on the shaft 65. The remaining end 64a of the link 64 is similarly bifurcated and provided with bearings which are received upon the shaft 11a of the grinding wheel 11, the end 64a being free to pivot upon the shaft 11a and this shaft, at the same time, being free to rotate in the bifurcated end 64a. Any suitable means for securing the links 63 and 64 against axial movement with respect to shafts 55a and 11a may be employed, and similar means may be provided to prevent axial movement of the shaft 65 with respect to the ends 63b and 64b of the two links.

A drive pulley 61 is secured to the motor drive shaft 55a in any suitable manner between the bifurcations of the end 63a of the link 63 and this pulley is connected to another pulley 66 by means of a belt 68, the pulley 66 being secured upon the idler shaft 65 between the bifurcations of the end 63b of the link 63 and the pulley 67 being secured upon the idler shaft 65 between the bifurcations of the end 64b of the link 64, this latter pulley in turn being connected by means of another belt 68 to a pulley 62 that is fixed to the grinding wheel shaft 11a between the bifurcations of the end 64a of the link 64.

It will thus be readily appreciated that the driving force of the motor 55 is transmitted by means of the pulleys 61 and 66 and the first belt 68 to the idler shaft 65, and that the power from this shaft is transmitted to the grinding wheel shaft 11a by means of the pulleys 67 and 62 and the second belt 68 extending therebetween. This power transmission is accomplished regardless of the relative angularity between the links 63 and 64. Thus, the work head 10 of the machine may be raised or lowered at will without requiring any change or adjustment of the drive transmission mechanism just described. As the head 10 is raised and lowered, the links 63 and 64 will merely pivot about the idler shaft 65 without affecting the power transmission capabilities of the apparatus.

The power transmission assembly just described has several important advantages. By virtue of this simple assembly the relatively heavy drive motor 55 may be mounted upon and carried directly by the platform 40 so that no part of the weight of the motor is carried by or impressed upon the work head 10. This permits the supporting mechanism for the work head to be relatively light and inexpensive in construction while at the same time permitting accurate and precision work to be done by the work head 10. Inasmuch as the drive motor 55 is independent of the work head, there is little tendency for motor vibrations to be transmitted to the work head and the need for having the drive motor dynamically balanced is thus greatly reduced, thereby permitting a less expensive motor to be employed. The use of heavy overhead structure is also avoided and, if desired, a relatively low speed motor may be employed.

Although the pulleys 61, 66 and 67 and 62 are shown in the drawings to be of the same diameter, this need not be the case inasmuch as these pulleys may easily be exchanged for pulleys of various relative diamters so that the speed of the grinding wheel shaft 11a with respect to the speed of the motor drive shaft 55a may be increased or decreased as desired. In order to compensate for changes that may be made in the pulley diameters, and in order to adjust the tension of the belts 68, it will be observed that the lengths of the links 63 and 64 may easily be adjusted. To this end, each of the links may be fabricated in two pieces, as previously described, the two parts of each link being arranged in overlapping relationship, as best seen in FIG. 7. The two parts may be joined together by bolts which extend through suitable slots in one piece and are threaded into the other piece. Thus, by loosening the bolts, the overlapping parts of the respective links 63 and 64 may be slidably adjusted on the bolts so as to vary the length of the two links.

Reference is now made to FIG. 6 which is a diagram for facilitating geometric proof of the above-specified characteristics of a Scott Russell type linkage. Since the illustrated individual linkages of each pair supporting the work table 12 and the platform 40 incorporate the principles of the Scott Russell linkage, the proof is applicable thereto.

One essential of a Scott Russell linkage and of the present linkages is that the pivotal axes of the pins 22, 26, 30 and 35 all be parallel. It is another essential that the line of sliding movement of the axis 26 intersect the axis 22 as well as the axis 26. This line of sliding movement of each linkage should also be perpendicular to the axes 22 and 26. It is also necessary that the distances between the axis 35 and the axes 22, 26 and 30 be equal. Still further, the axis 35 should be in line with the axes 26 and 30—that is that these three axes lie in a common plane. Finally, where such linkages are employed in pairs, it is necessary that the lines of sliding movement of a given pair of linkages be parallel to each other.

If each of the linkages meets these requirements, any point on the axis of the pin 30 is confined to linear movement. Where a body, such as the work table 12, is pivotal upon two axes 30 and 30a of such a pair of linkages, it will be seen that such body will be confined to linear movement in a single plane.

Proof of the indicated limitation on the movement of the free axis of the pin 30 is demonstrated below with reference to FIG. 6. In that diagram the four pivotal axes 22, 26, 30 and 35 are represented, the links 21 and 25 being shown as full lines extending between the proper ones of these pivot points. Phantom lines are shown extending between the axes 22 and 26 and the axes 22 and 30. If it can be shown that the angle A plus the angle C is always 90° for any position of the linkage, then the point on the axis 30 shown in FIG. 6 is necessarily confined to movement along a straight line, namely the phantom line intersecting the axes 22 and 30.

Angles A, B, C and D are designated in FIG. 6 and are referred to in the ensuing equations:

(1) $A=B$ (base angles of isosceles triangle)
(2) $C=D$ (base angles of isosceles triangle)
(3) $A+B+C+D=180°$ (sum of internal angles of a triangle)
(4) $2A+2C=180°$ (substituting Equations 1 and 2 in Equation 3
(5) $A+C=90°$ Since $A+C$ always equals 90°, and since the solution is general to all positions of the linkage, the axis 30 always intersects the phantom line which is perpendicular to the fixed line of sliding movement of the axis 26 and intersects the latter at the axis 22. Therefore, the axis 30 is confined to linear movement. Since each of the axes 30 and 30a or 30b and 30c of either pair of linkages is confined to linear movement, it will be apparent that the work table 12 or the platform 40 must move along a straight line in a single plane without change in its orientation.

It should be noted that the only requirements of the linkages for obtaining this result are those specified above. In particular, it should be noted that the two axes of the pins 30 and 30a need not move along the same line or plane, and that the specified distances between various axes of one linkage need not be the same as the specified distances between the axes of the other linkage. It is preferred, however, that the linkages be identical within a given pair and that they be arranged side by side as illustrated in FIG. 1.

It will readily be appreciated by those skilled in the art that the machine tool shown in the drawings and described above has numerous advantages over prior machine tools available for accomplishing the same sort of work. Commercially acceptable prior machine tools, in order to do precision work, have invariably been of heavy construction utilizing slides and ways. As stated at the outset herein, such slides and ways have been relatively expensive to manufacture inasmuch as their finishing has ordinarily been done by hand. Furthermore, such slides and ways are subject to considerably friction and to substantial wear particularly when abrasive materials are used or are present in and about the machine. The present machine tool, in contrast to those previously known, may be of relatively light construction and easily assembled with parts all of which may be mass produced and kept in stock. Parts of the present machine may therefore be readily interchangeable, although each part will have an extremely long life inasmuch as sealed ball bearings may be utilized substantially throughout the machine where there is relative movement between parts. When such bearings are used there will be little friction involved in the operation and movement of the parts and the bearings will be sealed against abrasives and other deleterious materials that may be used on or about the machine. Furthermore, it will be observed that the linkage assemblies in the present machine, which both guide and support the work and operating tool carrying members, that is, the work table 12 and the platform 40, are physically located beneath those members and extend between those members and the frame or base 13, thereby leaving the upper portions of the work and tool carrying members entirely unobstructed by the linkage assemblies or parts thereof.

A machine tool has now been described having novel apparatus for permitting relative movement of its work head and work table and for transmitting power between two relatively movable members. The combination of linkage assemblies disclosed is, of itself, novel, and is applicable to many other forms of apparatus.

While a particular embodiment of the invention has been disclosed, it will be understood, of course, that the invention is not limited thereto since many modifications may be made, and it is, therefore, contemplated to cover by the appended claims any such modifications as fall within the true spirit and scope of the invention.

I claim:

1. In a machine tool including an upstanding supporting frame and separate relatively movable operating tool and work carrying members, apparatus for supporting said members above said frame and for limiting said members to predetermined straight line linear relative movement comprising, a pair of spaced apart linkage assemblies respectively interconnecting each of said members and said frame and movably supporting each of said members on said frame out of weight supporting contact with said frame, each said linkage assembly being physically located beneath that said member supported thereby and being physically disposed between that said member and said frame, thereby leaving the respective upper sides of said members unobstructed, each said linkage assembly comprising a first link pivotally connected at one end to said frame adjacent that said member supported by that said linkage assembly, said first link depending from said frame for swinging movement about an axis perpendicular to the path of movement of that said member, and an upstanding second link double the length of said first link and pivotally connected at its midpoint to the lower end of said first link, means pivotally and slidably connecting the lower end of said second link to said frame below and in spaced relation to the pivot connection of said first link to said frame, means pivotally connecting the upper end of said second link to that said member, the axes of the pivotal connections of said first and second links to each other and to said frame and the pivotal connection of said upper end of said second link to that said member all being parallel, and the axis of the pivotal connection of said second link to that said member lying in a common plane with the axis of the pivotal connection of said first link to said frame, the slidable connection between said lower end of said second link and said frame being such as to permit slidable movement of said lower end of said second link only along a line perpendicular to said common plane, said linkage assemblies of each said pair being spaced apart in the direction of said predetermined linear movement of that said member connected to and supported thereby, one said pair of said linkage assemblies being connected to each of said members and the pivot axis of each of the pivotal connections of the pair of linkages connected to one of said members being angularly related to the pivot axis of each of the pivotal connections of the pair of linkages connected to the other of said members whereby said members are limited to movement in parallel planes and along respective linear paths transverse to each other.

2. In a machine tool or the like including a frame and a table member, apparatus for limiting said table member to rectilinear movement in a predetermined straight line path, said apparatus comprising a pair of linkage assemblies respectively interconnecting said table member and said frame and movably supporting said table member on said frame, said linkage assemblies being mounted for movement in planes perpendicular to said table member and being physically located between said table member and said frame and leaving an unobstructed work surface on said table member, each of said linkage assemblies comprising a first link and a second link, said second link being double the length of said first link, said first link being pivotally connected at one end to said frame adjacent said table for relative swinging movement about an axis perpendicular to the direction of linear movement of said table member and being pivotally interconnected at its other end to said second link at the midpoint of said second link about an axis parallel to said first mentioned axis, means pivotally and slidably connecting one end of said second link to said frame for swinging movement about an axis parallel to said first mentioned axis and for slidable movement only in a direction perpendicular to said predetermined path of movement of said table member, said second links of said pair of linkage assemblies being connected to said frame in spaced apart relation in the direction of movement of said table member and said first links of said pair of linkage assemblies also being connected to said frame in spaced apart relation in the direction of movement of said table member, and means pivotally connecting the other ends of both of said second links to said table member for pivotal movement relative to said table member about parallel axes spaced apart in the direction of movement of said table member and parallel to all of said previously mentioned axes.

3. The combination set forth in claim 2, wherein the lengths of said first links are equal to each other, and wherein the lengths of said second links are also equal to each other.

4. In a machine tool or the like including a frame and a table member, apparatus for limiting said table member to rectilinear movement in a predetermined straight line path, said apparatus comprising a pair of linkage assemblies respectively interconnecting said table member and said frame and movably supporting said table member on said frame, said linkage assemblies being mounted for movement in planes perpendicular to said table member and being physically located between said table member and said frame and leaving an unobstructed work surface on said table member, each of said linkage assemblies comprising a pair of first link members of equal length, and a second link, said second link being double the length of said first link members, said first link members being disposed in side-by-side spaced-apart position and being respectively connected at one of their ends to said frame adjacent said table for relative swinging movement about a common axis perpendicular to the direction of linear movement of said table member and being respectively pivotally interconnected at their other ends to said second link on opposite sides of and at the midpoint of said second link about a second common axis parallel to said first-mentioned axis, means pivotally and slidably connecting one end of said second link to said frame for swinging movement about an axis parallel to said first-mentioned axis and for slidable movement only in a direction perpendicular to said predetermined path of movement of said table member, said second links of said pair of linkage assemblies being connected to said frame in spaced-apart relation in the direction of movement of said table member, said respective pairs of said first link members of said linkage assemblies also being connected to said frame in spaced-apart relation in the direction of movement of said table member, and means pivotally connecting the other ends of both of said second links to said table member for pivotal movement relative to said table member about parallel axes spaced apart in the direction of movement of said table member and parallel to all of said previously mentioned axes, said linkage assemblies serving to support said table member and give the same lateral stability and serving to limit movement of said table member solely to said predetermined straight line path.

References Cited in the file of this patent

UNITED STATES PATENTS

| | | |
|---|---|---|
| 491,295 | Robinson | Feb. 7, 1893 |
| 789,737 | Hyde | May 16, 1905 |
| 1,818,675 | Cushman | Aug. 11, 1931 |
| 2,238,704 | Miller | April 15, 1941 |
| 2,592,200 | Seyferth | April 8, 1952 |
| 2,642,703 | Flygare et al. | June 23, 1953 |
| 2,872,758 | Hoerst | Feb. 10, 1959 |

OTHER REFERENCES

Publication: "Ingenious Mechanisms for Designers and Inventors," edited by Franklin D. Jones, copyright 1930, volume 1, pages 392 and 393.